(12) United States Patent
Jan (10) Patent No.: US 9,903,466 B2
(45) Date of Patent: Feb. 27, 2018

(54) WORM BACKLASH ADJUSTMENT DEVICE

(71) Applicant: Johnson Jan, Taichung (TW)

(72) Inventor: Johnson Jan, Taichung (TW)

( * ) Notice: Subject to any disclaimer, the term of this patent is extended or adjusted under 35 U.S.C. 154(b) by 333 days.

(21) Appl. No.: 14/965,915

(22) Filed: Dec. 11, 2015

(65) Prior Publication Data

US 2016/0097446 A1   Apr. 7, 2016

(30) Foreign Application Priority Data

Feb. 12, 2015   (TW) .............................. 104202252 U (51) Int. Cl.
*F16H 57/12* (2006.01)

(52) U.S. Cl.
CPC ....... *F16H 57/12* (2013.01); *F16H 2057/122* (2013.01); *F16H 2057/123* (2013.01)

(58) Field of Classification Search
CPC .................... F16H 2057/122; F16H 2057/123
See application file for complete search history.

(56) References Cited

U.S. PATENT DOCUMENTS

| | | | | |
|---|---|---|---|---|
| 5,042,315 A | * | 8/1991 | Fahy ....................... | F16H 57/12 74/411 |
| 5,765,440 A | * | 6/1998 | Yang ....................... | F16H 55/24 74/409 |
| 2004/0226395 A1 | * | 11/2004 | Diana ..................... | F16H 55/24 74/425 |
| 2006/0060026 A1 | * | 3/2006 | Hawkes .................. | F16H 55/24 74/661 |
| 2013/0312553 A1 | * | 11/2013 | Jan ......................... | F16H 57/12 74/89.17 |

* cited by examiner

*Primary Examiner* — Terence Boes (57) ABSTRACT

A worm backlash adjustment device includes a drive unit, a backlash adjustment unit, and a control device. The drive unit includes a first motor device, a first drive member, a linking member, a passive member, and a second drive member. The first drive member and the linking member are coaxially driven by the first motor device. The passive member is coaxially connected with the second drive member and linked by the linking member to turn reversely. The two drive members are disposed at two sides of a driven member to drive the driven member, respectively. The backlash adjustment unit includes a second motor device, a screw member, and a backlash adjustment member. Through the screw member, the backlash adjustment member is driven by the second motor device to move linearly. The second drive member has a drive function and a backlash adjustment function.

8 Claims, 6 Drawing Sheets

WORM BACKLASH ADJUSTMENT DEVICE

BACKGROUND OF THE INVENTION

1. Field of the Invention

The invention relates to a worm backlash adjustment device, and more particularly to a worm backlash adjustment device provided with a second drive member having a drive function and a backlash adjustment function. During transmission, the backlash can be adjusted and the torsion value of the backlash can be controlled and adjusted.

2. Description of the Prior Art

A worm and a worm gear are used as a transmission mechanism. When a backlash is occurred between the worm and the worm gear, it is unable to bring a good transmission rate except the engagement of the gear teeth is quite precise. Therefore, the assembly is quite troublesome and must be precise. As a result, the cost is high.

A device to adjust the backlash is developed on the market. This device is complicated and must be in cooperation with a spring structure. After a period of time, the spring structure may have an elastic fatigue, which results in that the backlash adjustment loses precision.

Accordingly, the inventor of the invention has devoted himself based on his many years of practical experiences to solve this problem.

SUMMARY OF THE INVENTION

The primary object of the invention is to provide a worm backlash adjustment device. The worm backlash adjustment device is provided with a second drive member having a drive function and a backlash adjustment function. During transmission, the backlash can be adjusted and the torsion value of the backlash can be controlled.

In order to achieve the aforesaid object, the worm backlash adjustment device of the invention comprises a drive unit, a backlash adjustment unit, and a control device. The drive unit comprises a first motor device, a first drive member, a linking member, a passive member, and a second drive member. The first drive member is connected with the first motor device and driven by the first motor device. The linking member is coaxially connected with the first drive member and linked by the first drive member. The linking member is disposed between the first motor device and the first drive member. The passive member is connected with the linking member and linked by the linking member to turn reversely. The second drive member is coaxially connected with the passive member and linked by the passive member. The second drive member and the first drive member are disposed at two sides of a driven member to drive the driven member, respectively.

The backlash adjustment unit comprises a second motor device. The second motor device is adapted to bring the passive member to move linearly.

The control device comprises a first driver, a first sensor, a second driver, and a driver control system. The first driver is adapted to output a first control signal to drive the first motor device. The first sensor is connected with the first driver and configured to sense a load current of the first driver. When a backlash is generated between at least one of the first drive member and the second drive member and the driven member, the load current has a change. The second driver is adapted to output one of a second clockwise-turning control signal and a second counterclockwise-turning control signal to turn the second motor device clockwise or counterclockwise. The passive member is moved linearly to pull/push the driven member so as to adjust the backlash between one of the first drive member and the second drive member and the driven member. The driver control system is configured to control the first driver to output the first control signal and to receive the load current transmitted by the first sensor. When the load current has a change, the driver control system controls the second driver to output one of the second clockwise-turning control signal and the second counterclockwise-turning control signal.

The worm backlash adjustment device of the invention characterized in that the second drive member is provided with a pivot portion extending out of the passive member. The backlash adjustment unit comprises a screw member and a backlash adjustment member. One end of the screw member is connected with the second motor device and driven by the second motor device. The backlash adjustment member comprises a thread transmission end portion and a pivot end portion. The thread transmission end portion is threadedly connected with another end of the screw member. The backlash adjustment member is limited and unable to turn. When the screw member is turned clockwise/counterclockwise, the backlash adjustment member is pulled or pushed to move linearly. The pivot end portion is pivotally connected with the pivot portion and turned by the passive member and the backlash adjustment member.

DETAILED DESCRIPTION OF THE PREFERRED EMBODIMENTS

Embodiments of the invention will now be described, by way of example only, with reference to the accompanying drawings.

Figure 1:
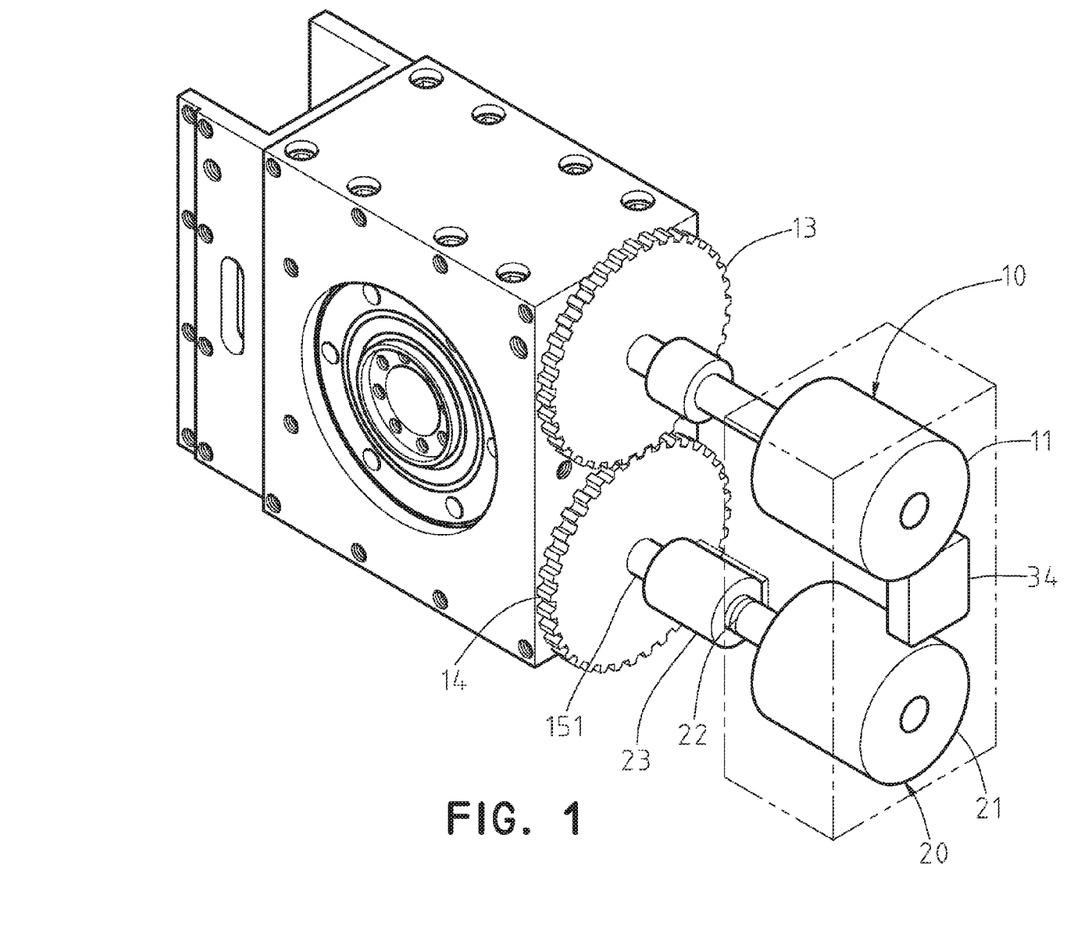
FIG. 1 is a perspective view of the invention.
Figure 2A:
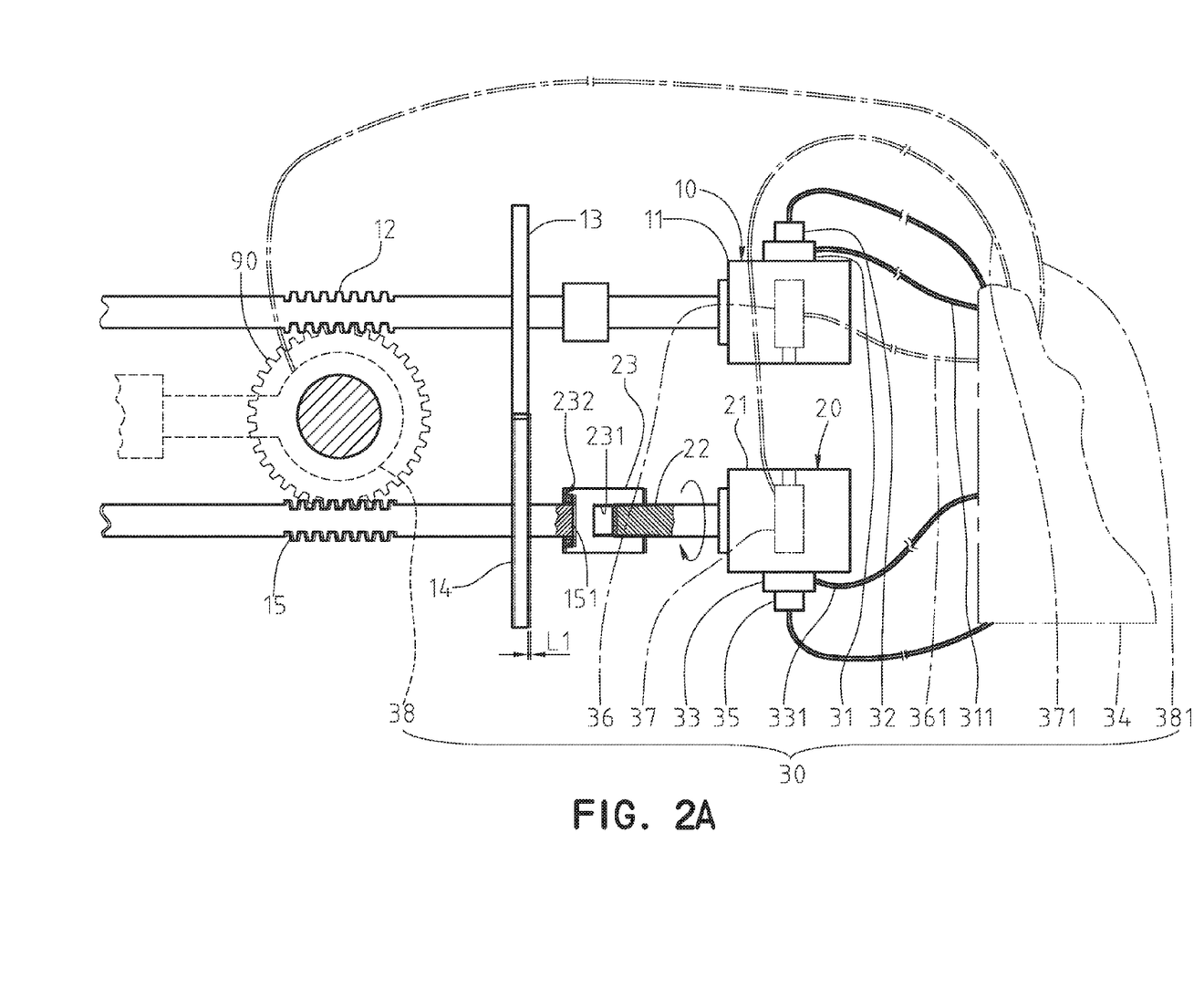
FIG. 2A is a schematic view of the invention, showing that the worm is pulled to adjust the backlash.

As shown in FIG. 1 and FIG. 2A, the invention discloses a worm backlash adjustment device comprises a drive unit 10, a backlash adjustment unit 20, and a control device 30.

The drive unit 10 comprises a first motor device 11, a first drive member 12, a linking member 13, a passive member 14, and a second drive member 15. The first drive member 12 is connected with the first motor device 11 and driven by the first motor device 11. The linking member 13 is coaxially connected with the first drive member 12 and linked by the first drive member 12. The linking member 13 is disposed between the first motor device 11 and the first drive member 12. The passive member 14 is connected with the linking member 13 and linked by the linking member 13 to turn reversely. The second drive member 15 is coaxially connected with the passive member 14 and linked by the passive member 14. The second drive member 15 and the first drive member 12 are disposed at two sides of a driven member 90 to drive the driven member 90, respectively.

Figure 2B:
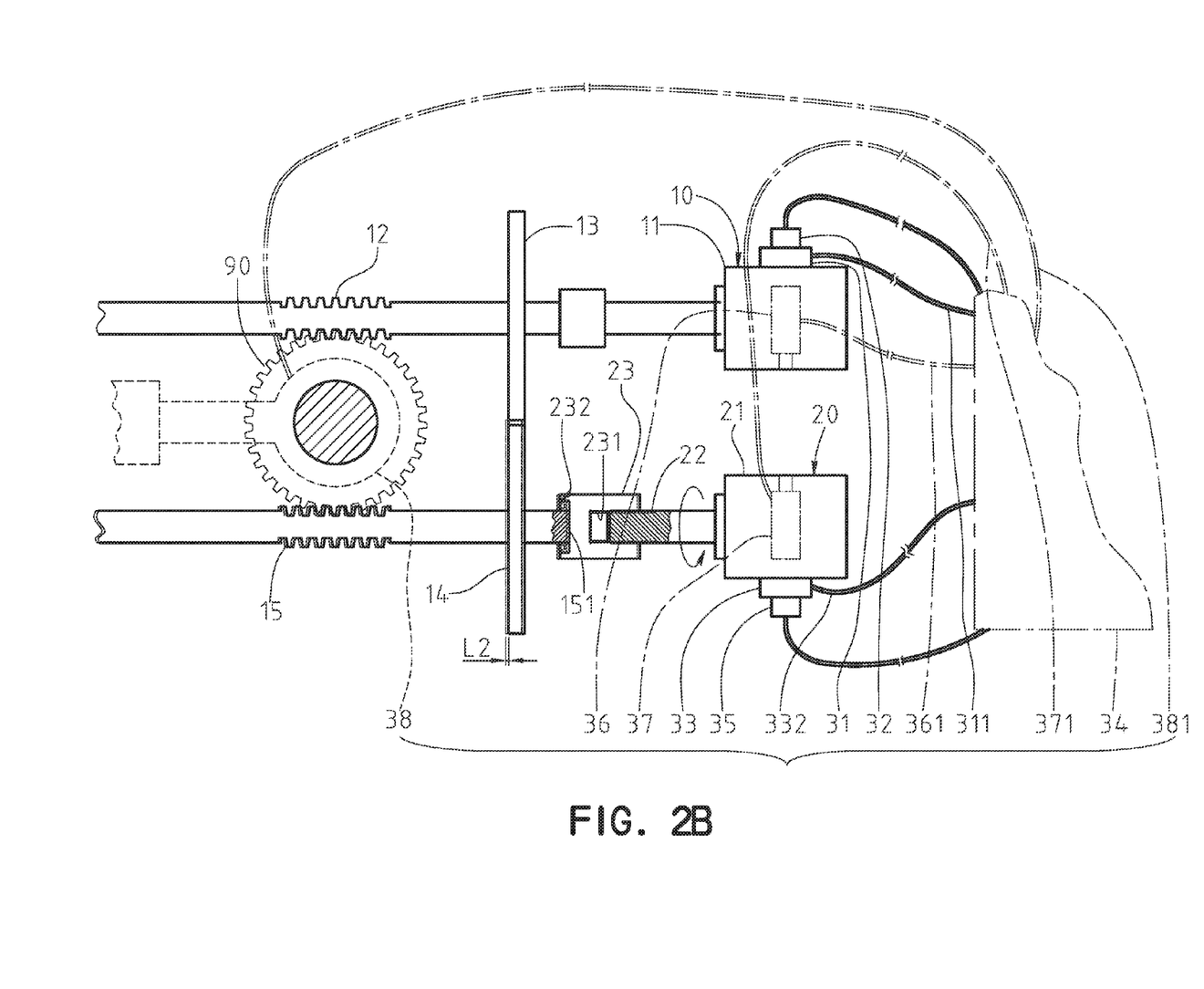
FIG. 2B is a schematic view of the invention, showing that the worm is pushed to adjust the backlash.

The backlash adjustment unit 20 comprises a second motor device 21. The second motor device 21 is adapted to bring the passive member 14 to move linearly. The control device 30 comprises a first driver 31, a first sensor 32, a second driver 33, and a driver control system 34. The first driver 31 is adapted to output a first control signal 311 to drive the first motor device 11. The first sensor 32 is connected with the first driver 31 and configured to sense the load current of the first driver 31. When a backlash is generated between at least one of the first drive member 12 and the second drive member 15 and the driven member 90 (referring to FIG. 3A and FIG. 3B, a backlash D1 or D2 defined between one of the first drive member 12 and the second drive member 15 and the driven member 90), the load current will have a change. The second driver 33 is adapted to output one of a second clockwise-turning control signal 331 (as shown in FIG. 2A) and a second counterclockwise-turning control signal 332 (as shown in FIG. 2B) to turn the second motor device 21 clockwise or counterclockwise, such that the passive member 14 is moved linearly to pull/push the driven member 90 so as to adjust the backlash D1 or D2 between one of the first drive member 12 and the second drive member 15 and the driven member 90. The driver control system 34 is configured to control the first driver 31 to output the first control signal 311 and to receive the load current transmitted by the first sensor 32. When the load current has a change, the driver control system 34 controls the second driver 33 to output one of the second clockwise-turning control signal 331 and the second counterclockwise-turning control signal 332.

Furthermore, the second drive member 15 is provided with a pivot portion 151 extending out of the passive member 14. The backlash adjustment unit 20 comprises a screw member 22 and a backlash adjustment member 23. One end of the screw member 22 is connected with the second motor device 21 and driven by the second motor device 21. The backlash adjustment member 23 comprises a thread transmission end portion 231 and a pivot end portion 232. The thread transmission end portion 231 is threadedly connected with another end of the screw member 22. The backlash adjustment member 23 is limited and unable to turn. When the screw member 22 is turned clockwise or counterclockwise, the backlash adjustment member 23 is pulled or pushed (referring to FIG. 2B) to move linearly. The pivot end portion 232 is pivotally connected with the pivot portion 151 and turned by the passive member 14 and the backlash adjustment member 23.

In an embodiment of the invention, the first motor device 11 can be one of a servo motor and a stepper motor. (It also can be a normal electric motor.) The technique to control the first motor device 11 to turn clockwise/counterclockwise and further to synchronously turn the first drive member 12 clockwise/counterclockwise and to turn the second drive member 15 clockwise/counterclockwise in a reverse direction is the prior art and won't be described hereinafter.

As to the relationship between the first drive member 12 and the second drive member 15, there are two embodiments. In a first embodiment, the first drive member 12 is a worm, the second drive member 15 is a worm, and the driven member 90 corresponding to the first drive member 12 and the second drive member 15 is also a worm. In a second embodiment, the first drive member 12 is a hypoid gear push rod, the second drive member 15 is a hypoid gear push rod, and the driven member 90 corresponding to the first drive member 12 and the second drive member 15 is also a hypoid gear. Thus, the first drive member 12 and the second drive member 15 are turned in opposite directions to respectively drive the driven member 90 from the two sides of the driven member 90.

In an embodiment of the invention, the second motor device 21 can be one of a servo motor and a stepper motor. As to the relationship between the linking member 13 and the passive member 14, there are two embodiments. In a first embodiment, the linking member 13 is a gear, and the passive member 14 is a gear to mesh with the linking member 13 and is driven by the linking member 13. In a second embodiment, referring to FIG. 5, the linking member 13 is a gear. The passive member 14 is a gear. The drive unit 10 comprises a first auxiliary gear 10A, a second auxiliary gear 10B, an adjustment gear 10C, and a transmittal member 10D. The transmittal member 10D has a transmittal inner surface 101 and a transmittal outer surface 102. The transmittal member 10D is wound around the linking member 13, the first auxiliary gear 10A, the passive member 14, the second auxiliary gear 10B, and the adjustment gear 10C. The transmittal outer surface 102 of the transmittal member 10D is in contact with the linking member 13 and driven by the linking member 13, with the transmittal inner surface 101 of the transmittal member 10D to drive the first auxiliary gear 10A, the passive member 14, the second auxiliary gear 10B, and the adjustment gear 10C. The adjustment gear 10C can be changed between a normal transmission position P1 and a tight transmission position P2, referring to FIG. 6. When the adjustment gear 10C is located at the normal transmission position P1, the transmittal member 10D runs a normal transmission. When the adjustment gear 10C is located at the tight transmission position P2, the transmittal member 10D runs a tight transmission.

Figure 5:
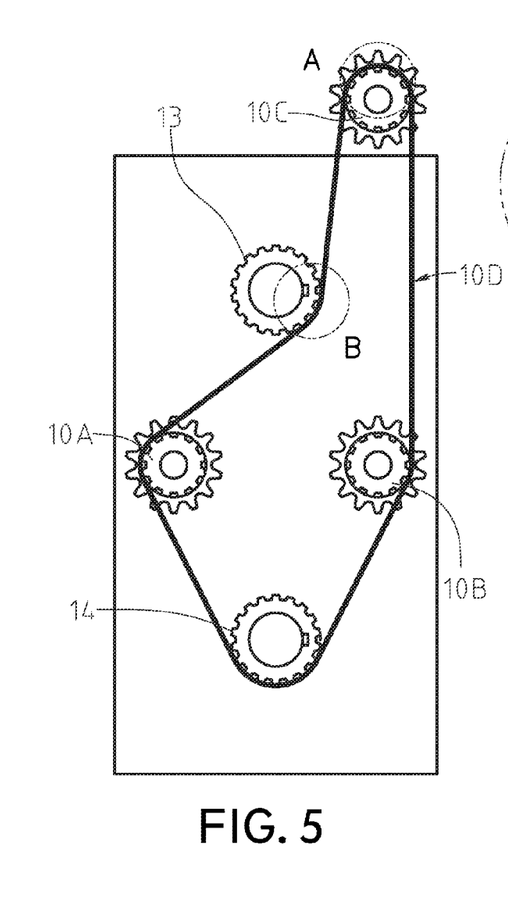
FIG. 5 is a schematic view of another embodiment of the drive unit of the invention.
Figures 5A, 5B, 6:
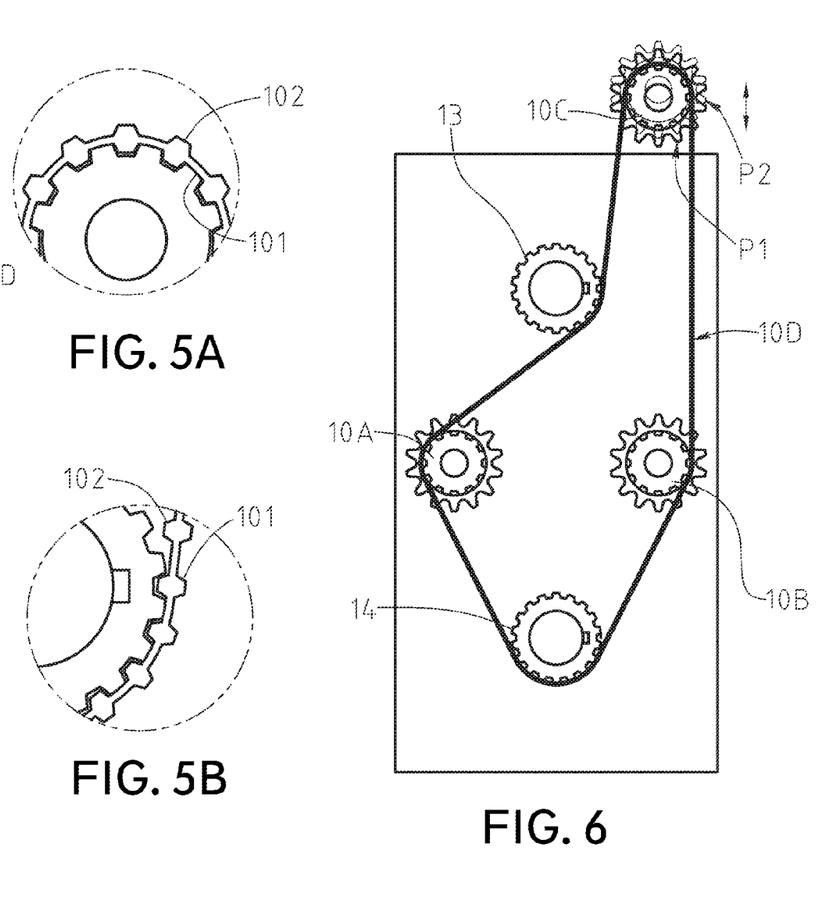
FIG. 5A is a detailed view of the area in circle A in FIG. 5.
FIG. 5B is a detailed view of the area in circle B in FIG. 5.
FIG. 6 is a schematic view showing the operation of a partial device of FIG. 5.

The passive member 14 and the transmittal inner surface 101 can perform a relative linear displacement. Except great precision, a micro linear displacement may happen between the traditional drive belt and the gears. This won't influence the transmission effect.

The control device 30 further comprises a second sensor 35. The second sensor 35 is connected with the second driver 32 and configured to sense the load current of the second driver 32. When a backlash (D1 or D2) is generated between at least one of the first drive member 12 and the second drive member 15 and the driven member 90, the load current will have a change. The driver control system 34 is configured to receive the load current transmitted by one of the first sensor 32 and the second sensor 35. When the load current has a change, the driver control system 34 controls the second driver 33 to output one of the second clockwise-turning control signal 331 and the second counterclockwise-turning control signal 332.

A first position detection device 36 is provided, which is one of an encoder and an optical ruler (not shown in the drawings). The first position detection device 36 is disposed on the first motor device 11, referring to FIG. 2A and FIG. 2B, and configured to send a first position detection signal 361 to the driver control system 34. The first position detection signal 361 indicates the turning angle (or a displacement position to enhance the precision for a backlash adjustment) of the first motor device 11.

A second position detection device 37 is provided, which is one of an encoder and an optical ruler (not shown in the drawings). The second position detection device 37 is disposed on the second motor device 21 and configured to send a second position detection signal 371 to the driver control system 34. The second position detection signal 371 indicates the turning angle (or a displacement position to enhance the precision for a backlash adjustment) of the second motor device 21. A third position detection device 38 is provided, which is one of an encoder and an optical ruler (not shown in the drawings). The third position detection device 38 is disposed on the driven member 90 and configured to send a third position detection signal 381 to the driver control system 34. The third position detection signal 381 indicates the turning angle (or a displacement position to enhance the precision for a backlash adjustment) of the driven member 90.

Thereby, the driver control system 34 can detect a relative displacement position between the first drive member 12 and the driven member 90 through the first and third position detection signals 361, 381. (The relative displacement position can be called as an angle, which is the prior art and won't be described hereinafter, to enhance the precision for a backlash adjustment.) The driver control system 34 can detect a relative displacement position between the second drive member 15 and the driven member 90 through the second and third position detection signals 371, 381. (The relative displacement position can be called as an angle, which is the prior art and won't be described hereinafter, to enhance the precision for a backlash adjustment.)

Both the first drive member 12 and the second drive member 15 can be provided with a torsion sensor (It is the prior art and not shown in the drawings.) electrically connected with the driver control system 34 for sensing the torsion of the first drive member 12 and the second drive member 15 to enhance the precision for a backlash adjustment.

The operation process of the invention is classified into the following two modes.

(A) driver drive mode: Through the driver control system 34, the control device 30 is actuated to control the first driver 31 to output the first control signal 311 to start the first motor device 11. The first motor device 11 brings the first drive member 12 to turn. The first drive member 12 drives the linking member 13 to turn. The linking member 13 links the passive member 14 to turn reversely. The passive member 14 coaxially drives the second drive member 15 to turn. The first and second drive members 12, 15 are respectively turned clockwise and counterclockwise to drive the driven member 90 from the two sides of the driven member 90.

Figure 3A:
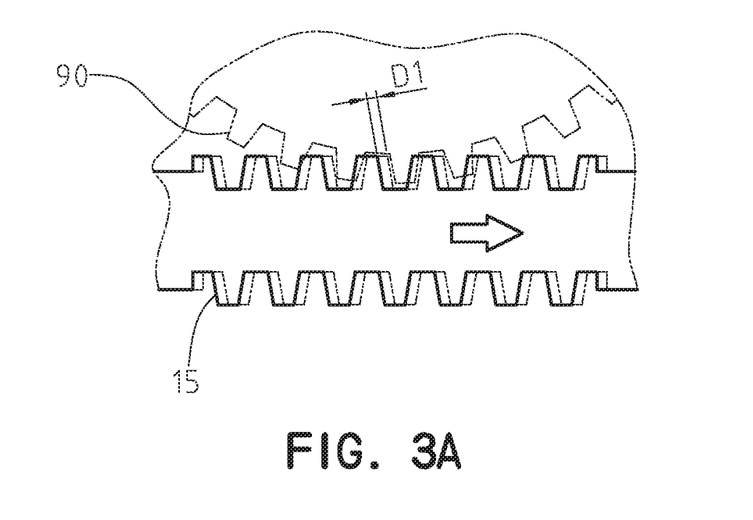
FIG. 3A is a partial enlarged view of FIG. 2A.
Figure 3B:
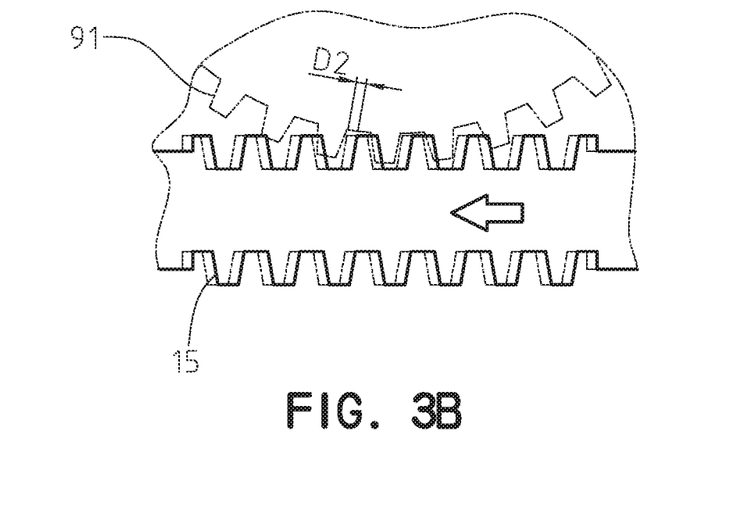
FIG. 3B is a partial enlarged view of FIG. 2B.
Figure 4:
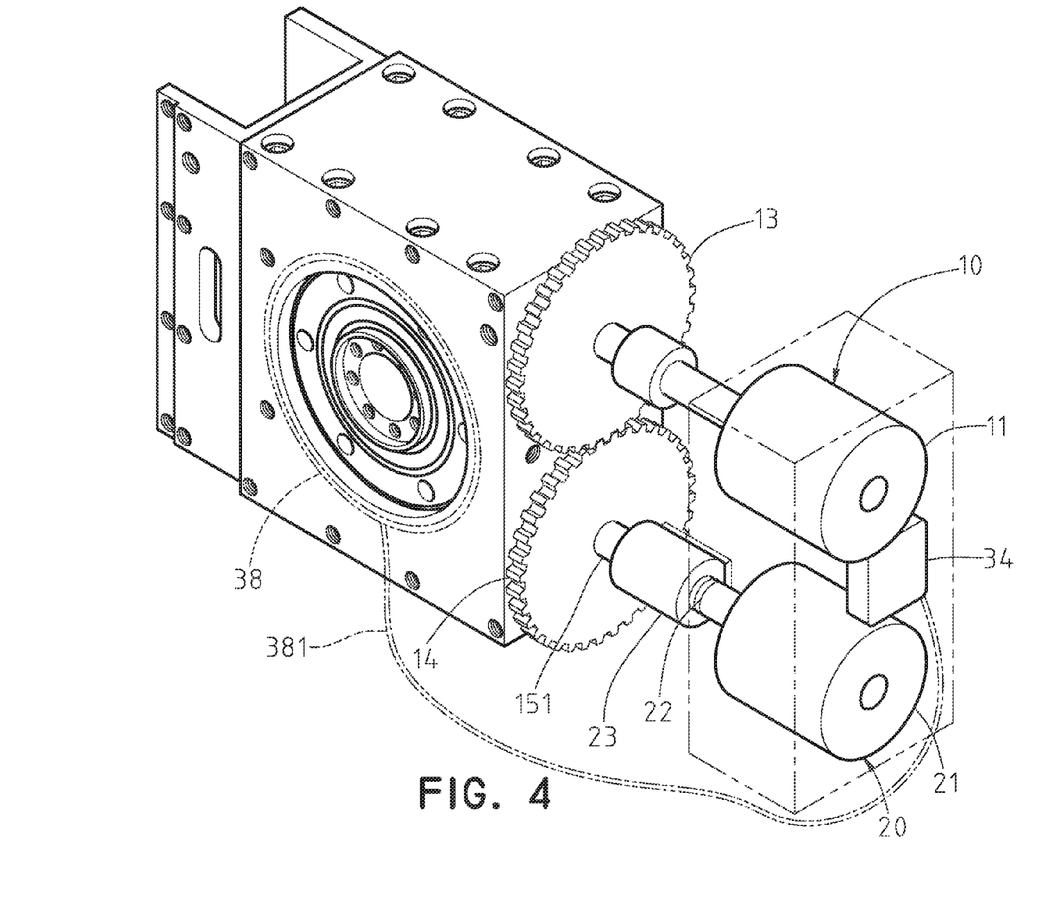
FIG. 4 is a schematic view of another embodiment of the invention.

When a backlash (D1 or D2) is generated between at least one of the first drive member 12 and the second drive member 15 and the driven member 90, the following mode is carried out:

(B) driver adjustment backlash mode: When the load current transmitted by at least one of the first sensor 32 and the second sensor 35 has a change, the driver control system 34 controls the second driver 33 to output one of the second clockwise-turning control signal 331 and the second counterclockwise-turning control signal 332 to turn the second motor device 21 clockwise or counterclockwise. The backlash adjustment member 23 is limited and unable to turn (referring to FIG. 1 and FIG. 4, the outer surface of the backlash adjustment member, at a predetermined position, is a limit flat surface and it can carry out a relative linear movement relative to a retaining object as shown by the dash-dot lines.) The screw member 22 is to pull or push the backlash adjustment member 23 through the thread transmission end portion 231. Through the pivot portion 151, the backlash adjustment member 23 is to pull (as shown in FIG. 2A, to pull a backlash adjustment distance L1 which depends on the size of the real entire mechanism) and push (as shown in FIG. 2B, to push a backlash adjustment distance L2 which depends on the size of the real entire mechanism) the passive member 14. The passive member 14 and the second drive member 15 are moved linearly to pull or push the driven member 90, respectively, so as to adjust the backlash (D1 or D2) between at least one of the first drive member 12 and the second drive member 15 and the driven member 90. As shown in FIG. 3A and FIG. 3B, the solid lines of the second drive member 15 are to show the position before adjustment, and the dash-dot lines are to show the disappearance position of the backlash D1 or D2 after adjustment.

If the backlash to be adjusted is smaller, the first drive member 12 and the second drive member 15 to drive the driven member 90 more steady. The vibration caused by the backlash is lowered accordingly, having an anti-vibration effect.

The range to adjust the backlash can be set according to the actual demand. It can be adjusted in advance before the device leaves the factory, alternatively, it can be adjusted from time to time according to the actual demand after the device leaves the factory.

Furthermore, the second clockwise-turning control signal 331 and the second counterclockwise-turning control signal 332 can be electric signals.

The driver control system 34 can control the strength of the second clockwise-turning control signal 331 output by the second driver 33 to increase or decrease the torsion value for the second drive member 15 to pull the driven member 90.

The driver control system 34 can control the strength of the second counterclockwise-turning control signal 332 output by the second driver 33 to increase or decrease the torsion value for the second drive member 15 to push the driven member 90.

To sum up, the advantages of the invention are as follows:
1. The second drive member has a drive function and a backlash adjustment function. The second drive member and the first drive member are turned clockwise and counterclockwise to drive the driven member, respectively. The second drive member can be pulled or pushed by the second motor device to adjust the backlash between one of the first drive member and the second drive member and the driven member.
2. During transmission, the backlash can be adjusted instantaneously. The control device of the invention can instantaneously control the second motor device to pull or push the second drive member according to the change of the load current.
3. The torsion value to adjust the backlash can be controlled. The second clockwise-turning control signal and the second counterclockwise-turning control signal of the invention are electric signals. The driver control system can control the strength of the second clockwise-turning control signal output by the second driver to increase or decrease the torsion value for the second drive member to pull the driven member. The driver control system can control the strength of the second counterclockwise-turning control signal output by the second driver to increase or decrease the torsion value for the second drive member to push the driven member.

While the invention has been described in terms of preferred embodiments, those skilled in the art will recognize that the invention can be practiced with modifications within the spirit and scope of the appended claims.

What is claimed is:

1. A worm backlash adjustment device, comprising a drive unit, a backlash adjustment unit, and a control device;
the drive unit comprising a first motor device, a first drive member, a linking member, a passive member, and a second drive member;
the first drive member being connected with the first motor device and driven by the first motor device;
the linking member being coaxially connected with the first drive member and linked by the first drive member, the linking member being disposed between the first motor device and the first drive member;
the passive member being connected with the linking member and linked by the linking member to turn reversely;
the second drive member being coaxially connected with the passive member and linked by the passive member, the second drive member and the first drive member being disposed at two sides of a driven member to drive the driven member, respectively;
the backlash adjustment unit comprising a second motor device, the second motor device being adapted to bring the passive member to move linearly;
the control device comprising a first driver, a first sensor, a second driver, and a driver control system;
the first driver being adapted to output a first control signal to drive the first motor device;
the first sensor being connected with the first driver and configured to sense a load current of the first driver, wherein when a backlash is generated between at least one of the first drive member and the second drive member and the driven member, the load current has a change;
the second driver being adapted to output one of a second clockwise-turning control signal and a second counterclockwise-turning control signal to turn the second motor device clockwise or counterclockwise, the passive member being moved linearly to pull or push the driven member so as to adjust the backlash between one of the first drive member and the second drive member and the driven member;
the driver control system being configured to control the first driver to output the first control signal and to receive the load current transmitted by the first sensor, wherein when the load current has a change, the driver control system controls the second driver to output one of the second clockwise-turning control signal and the second counterclockwise-turning control signal; characterized in that:
the second drive member is provided with a pivot portion extending out of the passive member;
the backlash adjustment unit comprises a screw member and a backlash adjustment member;
one end of the screw member is connected with the second motor device and driven by the second motor device;
the backlash adjustment member comprises a thread transmission end portion and a pivot end portion, the thread transmission end portion is threadedly connected with another end of the screw member, the backlash adjustment member is limited and unable to turn, wherein when the screw member is turned clockwise or counterclockwise, the backlash adjustment member is pulled or pushed to move linearly; the pivot end portion is pivotally connected with the pivot portion and turned by the passive member and the backlash adjustment member.

2. The worm backlash adjustment device as claimed in claim 1, wherein the first motor device is one of a servo motor and a stepper motor; the first drive member is a worm; the second drive member is a worm; the driven member corresponding to the first drive member and the second drive member is a worm; the first drive member and the second drive member at the two sides of the driven member are turned clockwise and counterclockwise to drive the driven member respectively; and the second motor device is one of a servo motor and a stepper motor.

3. The worm backlash adjustment device as claimed in claim 1, wherein the first motor device is one of a servo motor and a stepper motor; the first drive member is a hypoid gear push rod; the second drive member is a hypoid gear push rod; the driven member corresponding to the first drive member and the second drive member is a hypoid gear; the first drive member and the second drive member at the two sides of the driven member are turned clockwise and counterclockwise to drive the driven member respectively; and the second motor device is one of a servo motor and a stepper motor.

4. The worm backlash adjustment device as claimed in claim 1, wherein the linking member is a gear, and the passive member is a gear to mesh with the linking member and is driven by the linking member.

5. The worm backlash adjustment device as claimed in claim 1, wherein the linking member is a gear; the passive member is a gear; the drive unit comprises a first auxiliary gear, a second auxiliary gear, an adjustment gear, and a transmittal member; the transmittal member has a transmittal inner surface and a transmittal outer surface; the transmittal member is wound around the linking member, the first auxiliary gear, the passive member, the second auxiliary gear, and the adjustment gear; the transmittal outer surface of the transmittal member is in contact with the linking member and driven by the linking member, with the transmittal inner surface of the transmittal member to drive the first auxiliary gear, the passive member, the second auxiliary gear, and the adjustment gear; the adjustment gear is changeable between a normal transmission position and a tight transmission position, wherein when the adjustment gear is located at the normal transmission position, the transmittal member runs a normal transmission; when the adjustment gear is located at the tight transmission position, the transmittal member runs a tight transmission.

6. The worm backlash adjustment device as claimed in claim 1, wherein the control device further comprises a second sensor, the second sensor is connected with the second driver and configured to sense a load current of the second driver, when a backlash is generated between at least one of the first drive member and the second drive member and the driven member, the load current has a change; the driver control system is configured to receive the load current transmitted by one of the first sensor and the second sensor, when the load current has a change, the driver control system controls the second driver to output one of the second clockwise-turning control signal and the second counterclockwise-turning control signal.

7. The worm backlash adjustment device as claimed in claim 1, further comprising a first position detection device and a third position detection device;
the first position detection device being disposed on the first motor device and configured to send a first position detection signal to the driver control system, the first position detection signal indicating a turning angle of the first motor device;

the first position detection device being one of an encoder and an optical ruler;

the third position detection device being disposed on the driven member and configured to send a third position detection signal to the driver control system, the third position detection signal indicating a turning angle of the driven member;

the third position detection device being one of an encoder and an optical ruler;

the driver control system detecting a relative displacement position between the first drive member and the driven member through the first and third position detection signals.

8. The worm backlash adjustment device as claimed in claim 1, further comprising a second position detection device and a third position detection device;

the second position detection device being disposed on the second motor device and configured to send a second position detection signal to the driver control system, the second position detection signal indicating a turning angle of the second motor device;

the second position detection device being one of an encoder and an optical ruler;

the third position detection device being disposed on the driven member and configured to send a third position detection signal to the driver control system, the third position detection signal indicating a turning angle of the driven member;

the third position detection device being one of an encoder and an optical ruler;

the driver control system detecting a relative displacement position between the second drive member and the driven member through the second and third position detection signals.

* * * * *